United States Patent
Schimert et al.

(10) Patent No.: US 8,165,826 B2
(45) Date of Patent: Apr. 24, 2012

(54) DATA DRIVEN METHOD AND SYSTEM FOR PREDICTING OPERATIONAL STATES OF MECHANICAL SYSTEMS

(75) Inventors: James Schimert, Seabeck, WA (US); Sabyasachi Basu, Redmond, WA (US); Art Wineland, Long Beach, CA (US); Scott Farner, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 767 days.

(21) Appl. No.: 12/241,643

(22) Filed: Sep. 30, 2008

(65) Prior Publication Data

US 2010/0082267 A1  Apr. 1, 2010

(51) Int. Cl.
*G01B 3/00* (2006.01)
(52) U.S. Cl. .......................... 702/34; 702/184
(58) Field of Classification Search .............. 702/34, 702/184
See application file for complete search history.

(56) References Cited

U.S. PATENT DOCUMENTS

| | | | |
|---|---|---|---|
| 5,552,984 A * | 9/1996 | Crandall et al. | 701/31 |
| 7,062,370 B2 | 6/2006 | Vhora et al. | |
| 7,379,845 B2 * | 5/2008 | Gorinevsky et al. | 702/184 |
| 7,457,732 B2 * | 11/2008 | Aragones et al. | 703/2 |
| 2004/0078171 A1 * | 4/2004 | Wegerich et al. | 702/188 |
| 2004/0243636 A1 * | 12/2004 | Hasiewicz et al. | 707/104.1 |
| 2005/0096873 A1 * | 5/2005 | Klein | 702/184 |
| 2007/0198215 A1 * | 8/2007 | Bonanni et al. | 702/183 |
| 2009/0216393 A1 * | 8/2009 | Schimert | 701/14 |

OTHER PUBLICATIONS

Huang, Runqing et al., "Residual life predictions for ball bearings based on self-organizing map and back propagation neural network methods," Mechanical Systems and Signal Processing. 2007;21:193-207.
Schwabacher, Mark A., "A Survey of Data-Driven Prognostics," American Institute of Aeronautics and Astronautics. Sep. 26-29, 2005, AIAA 2005-7002.
Breiman, Leo, "Random Forests," Machine Learning. 2001;45:5-32.
Schwabacher, Mark et al., "A Survey of Artificial Intelligence for Prognostics," NASA Ames Research Center, Moffett Field, CA 94035; MS 269-3.
Breiman, Leo, "Bagging Predictors," Machine Learning. 1996;24,123-140.
Breiman, Leo, "Statistical Modeling: The Two Cultures," Statistical Science. 2001;16,3:199-231.
Breiman, Leo, "Out-of-Bag Estimation," Statistics Department, University of California, Berkeley, CA. 1996:1-13.
Sykes, Alan O., "An Introduction to Regression Analysis," Chicago Working Paper in Law & Economics, The Inaugural Coase Lecture. 1993:1-33.

* cited by examiner

*Primary Examiner* — Jonathan C Teixeira Moffat (57) ABSTRACT

There is provided an automated data driven method for predicting one or more operational states, such as wear or degradation, of a mechanical system over time. The method has the steps of collecting data on the mechanical system from a data recording device, preprocessing the collected data, selecting a training data set that represents a base condition for statistical comparison, fitting a statistical model to the training data set to relate a predicted response to nuisance variables at the base condition, and using an output model to predict what an observed response would have been at the base condition and calculating the difference between the observed response and the predicted response to predict the one or more operational states of the mechanical system.

18 Claims, 4 Drawing Sheets

2 ENGINE MODEL

|  | LEGACY | RANDOM FOREST |
|---|---|---|
| MAX - MIN MOVING AVERAGE (10) | 41.74 | 39.84 |
| MEDIAN SCATTER (10) | 16.12 | 12.46 |
| MAX - MIN MOVING AVERAGE (60) | 35.91 | 34.28 |
| MEDIAN SCATTER (60) | 18.34 | 14.19 |

FIG.5

3 ENGINE MODEL

|  | LEGACY | RANDOM FOREST |
|---|---|---|
| MAX - MIN MOVING AVERAGE (10) | 40.99 | 41.06 |
| MEDIAN SCATTER | 16.03 | 11.63 |
| MAX - MIN MOVING AVERAGE (60) | 33.80 | 32.54 |
| MEDIAN SCATTER | 18.36 | 14.00 |

FIG.6

DATA DRIVEN METHOD AND SYSTEM FOR PREDICTING OPERATIONAL STATES OF MECHANICAL SYSTEMS

BACKGROUND OF THE DISCLOSURE

1) Field of the Disclosure

The disclosure relates to a data driven method and system for predicting operational states of mechanical systems. In particular, the disclosure relates to a data driven method and system for predicting operational states, such as wear or anomalies over time, of mechanical systems.

2) Description of Related Art

Mechanical systems, such as engines, turbines, tires, brakes, and other system components, found in aircraft, automobiles, trucks, watercraft, power generator units, military vehicles, and other vehicles, wear or change over time. Wear affects the performance of such mechanical systems. A key factor in monitoring the health of a mechanical system is to measure the amount of wear to the system as it occurs over time. Such monitoring can aid in maintenance planning and timely repair or replacement of the mechanical system or components of the mechanical system. For example, with gas turbine engines, to get the same thrust output as an engine wears, the engine requires more fuel, and the engine's exhaust gas temperature (EGT), as it leaves the engine, increases. However, EGT is also affected by outside or "nuisance" variables, such as environmental influences (e.g., temperature and air quality), flight conditions, system faults, and other engine parameters for any given flight or data point. Such factors may affect EGT more than wear for a given data point. Typically, engine wear is not evident in a time series plot of raw EGT data plotted over the lifetime of an engine. Thus, EGT by itself may not reveal engine wear that is hidden by the variability due to environmental, operational and other factors.

Known methods and systems exist for monitoring and predicting the wear of a mechanical system. Empirical methods and systems for mechanical system predictions typically manually manipulate recorded data into tables for lookup to predict system wear and anomalies. Such manual empirical methods are limited in the amount of data that can be assembled and are not in an automated format to create a prediction model. In addition, such manual methods may be imprecise because of the outside influences discussed above. Other known methods and systems use theoretical models of the mechanical system which use physics or engineering information to build a model using test data. Such modeling is based on understanding how a system operates and progresses to a failure via knowledge, for example, of material properties and response to loading. However, such physics or engineering model based methods may use simplifying assumptions and are theoretical in nature. Moreover, such methods and systems only collect data when the engine is new and do not continually collect data during flights or track degradation of a system over time. Outside influences, as in the empirical method, are not accounted for.

With regard to known methods and systems that predict mechanical system wear over time, the resulting output must be trended over time due to the imprecision of individual points. The scatter of the individual points is large enough that large rolling averages are required to obtain a value that can be used with confidence. This can cause time delays for any corrective action that may be needed and also for prediction of scheduled maintenance for the engine.

Accordingly, there is a need for a data driven method and system for predicting operational states, such as wear or anomalies over time, of mechanical systems that provide advantages over known methods and systems.

SUMMARY OF THE DISCLOSURE

This need for a data driven method and system for predicting operational states, such as wear or anomalies over time, of mechanical systems is satisfied. None of the known methods and systems provide all of the numerous advantages discussed herein. Unlike known methods and systems, embodiments of the method and system of the disclosure may provide one or more of the following advantages: provides a data driven method and system to accurately monitor and predict a mechanical system's operational state, such as wear or anomalies over time, to assist in maintenance planning; provides an automated data driven method and system that use large amounts of data and allow for continual updates of new data in conditions under which the mechanical system operates; provides a method and system that use a machine learning algorithm on large amounts of historical data collected during operation or flight to monitor and predict degradation of a system over time; provides a method and system that produce results having less variation and greater precision; provides a method and system that anticipate failures of mechanical systems (degradation indicators) and reduce unplanned maintenance; provides a method and system that monitor and predict wear or degradation as the mechanical system is used and predict the remaining useful life in order to repair or replace such mechanical system in a timely manner; provides an automated method and system that is cost saving and efficient; provides a data driven method and system that apply statistical models to data collected over a mechanical system's life to account for irrelevant factors and generate a predictive model of wear; and provides a data driven method and system that can be used with mechanical systems and components, such as engines, turbines, tires, and brakes, found in aircraft, automobiles, trucks, watercraft, power generator units, military vehicles, and other vehicles.

In an embodiment of the disclosure, there is provided an automated data driven method for predicting one or more operational states of a mechanical system over time, the method comprising the steps of: collecting data on the mechanical system from a data recording device; preprocessing the collected data; selecting a training data set that represents a base condition for statistical comparison; fitting a statistical model to the training data set to relate a predicted response to nuisance variables at the base condition; and, using an output model to predict what an observed response would have been at the base condition and calculating the difference between the observed response and the predicted response to predict the one or more operational states of the mechanical system.

In another embodiment of the disclosure, there is provided an automated data driven method for predicting wear of a mechanical system over time, the method comprising the steps of: collecting data on the mechanical system from a data recording device; determining and measuring one or more technical parameters of the mechanical system relevant to the predicting of wear of the mechanical system; preprocessing the collected data to summarize operation of the mechanical system; selecting a training data set that represents a base condition for statistical comparison; fitting a statistical model to the training data set to relate a predicted response to nuisance variables at the base condition; using an output model to predict what an observed response would have been at the base condition and calculating the difference between the observed response and the predicted response to predict the wear of the mechanical system; plotting the predicted wear; and, using the plotted wear for trend analysis.

In another embodiment of the disclosure, there is provided an automated data driven system for predicting one or more operational states of a mechanical system over time comprising: a data collection component for collecting data on the mechanical system; a preprocessing component for preprocessing the collected data; a training data set selection component for selecting a training data set that represents a base condition for statistical comparison; a statistical modeling component for fitting a statistical model to the training data set to relate a predicted response to nuisance variables at the base condition; an output model component; and, a predicting component that uses the output model to predict what an observed response would have been at the base condition and calculates the difference between the observed response and the predicted response to predict the one or more operational states of the mechanical system in order to generate a predicted operational state component.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION OF THE DISCLOSURE

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The method and system of the disclosed embodiments may be used in connection with mechanical systems, such as engines, turbines, tires, and brakes, found in aircraft, automobiles, trucks, watercraft, power generator units, military vehicles, and other vehicles. Accordingly, one of ordinary skill in the art will recognize and appreciate that the method and system of the disclosure can be used in any number of applications involving the predicting or monitoring of one or more operational states of a mechanical system over time.

Figure 1:
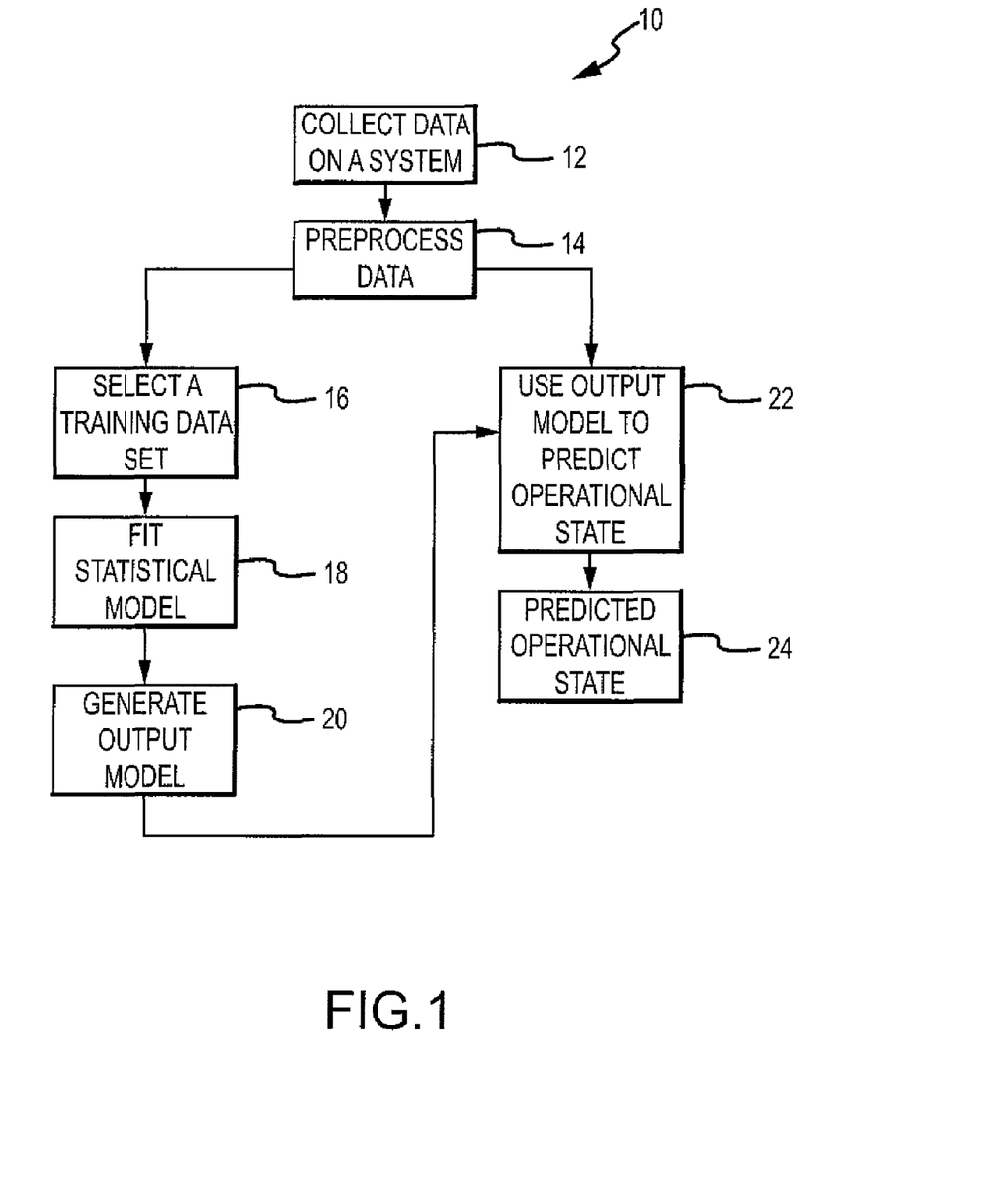
FIG. 1 is a block flow diagram of one embodiment of the data driven system and method of the disclosure.

In an embodiment of the disclosure there is provided an automated data driven method for predicting one or more operational states, such as wear, degradation, part failure, or anomalies, of a mechanical system over time. In another embodiment of the disclosure, there is provided an automated data driven system for predicting one or more operational states, such as wear, degradation, part failure, or anomalies, of a mechanical system over time. The mechanical systems may include engines, turbines, tires, and brakes, found in aircraft, automobiles, trucks, watercraft, power generator units, military vehicles, and other vehicles. FIG. 1 is a block flow diagram of one embodiment of the data driven system and method of the disclosure, as indicated by reference number 10. The system 10 comprises a data collection component 12 for collecting data on the mechanical system, a preprocessing component 14 for preprocessing the collected mechanical system data, a training data set selection component 16 for selecting a training data set that represents a base condition for statistical comparison, a statistical modeling component 18 for fitting a statistical model to the training data set to relate a predicted response to nuisance variables at the base condition in order to generate an output model component 20, and a predicting component 22 that uses the output model to predict what an observed response would have been at the base condition and calculates the difference between the observed response and the predicted response to predict the one or more operational states, such as wear, degradation, part failure, or anomalies, of the mechanical system in order to generate a predicted operational state component 24.

These components are discussed in more detail in connection with the method embodiments of the disclosure. In one of the embodiments of the disclosure, the method comprises the step of collecting data on the mechanical system via a data collection component, such as from a data recording device. The method collects and uses far more data, compared to known empirical and theoretical based models and compared to existing manufacturer or legacy data. The data collected may include numerous technical parameters specific to a particular mechanical system, as well as various environmental and operational data. For example, the data collected for an aircraft engine may include, but is not limited to, such data as exhaust gas temperature (EGT), Mach number, engine spool speeds, pressure altitude, total air temperature, calibrated air speed, oil pressure, oil quantity, sensor information, heater information, fuel flow, engine pressure ratio, flight mode, throttle lever angle, and other suitable data. In addition, the data recording device for collecting data for an aircraft engine may be a Quick Access Recorder (QAR) on an aircraft. Such data may be recorded and collected from a single aircraft or multiple aircraft over the lifetime of the mechanical system. The data may be recorded and collected during initial climb of the aircraft over many flights, during descent of the aircraft over many flights, during cruise of the aircraft over many flights, or during other operational modes of the aircraft. The collecting data step may further comprise the step of determining one or more technical parameters of the mechanical system to be measured relevant to the predicting of the one or more operational states. Such technical parameters may be determined or measured via the use of one or more sensors on the mechanical system.

In this embodiment the method further comprises the step of preprocessing the collected mechanical system data to summarize operation of the mechanical system. The preprocessing step preprocesses the collected mechanical system data via the preprocessing component. The preprocessing step transforms the large amounts of mechanical system data collected into snapshots of data representative of the health of the mechanical system that a user is most interested in. The preprocessing step determines when during the operation of the mechanical system the data is collected, what parameters of the mechanical system are to be monitored or predicted, and how to reduce the amount of data to determine the results. The preprocessing software code may be written in any suitable software programming environment. By example, with aircraft, the data (e.g., propulsion flight data) may be summarized from a single aircraft flight or multiple aircraft flights over the lifetime of the mechanical system. In order to trend aircraft engine EGT over time, the most stable engine operational point possible must be obtained for each flight, ideally at or near the maximum engine operating point. During flight this occurs in two modes: cruise and takeoff. Very stable engine data and aircraft parametric data may be recorded during aircraft cruise. However, the aircraft may not reach cruise during every flight (e.g. during training). Also, during cruise, the engine is not near its maximum operation. During takeoff, the engine is operating near or at its maximum for a fixed period of time, but aircraft parametric and other engine data may be changing. The algorithm of the method finds a window of data in which maximum EGT occurs.

In this embodiment, the method further comprises the step of selecting a training data set that represents a base condition for statistical comparison. The training data set is selected via a training data set selection component, along with subject matter expert (SME) input. This step creates training data sets during periods of time when the mechanical system output (e.g., engine EGT) is relatively stable, yet there is sufficient variability in other nuisance factors (e.g., environmental, flight, and mechanical parameters) to represent the variety of conditions under which the mechanical system (e.g., aircraft engine) operates. This step creates appropriate training data sets of the mechanical system's environment (e.g., aircraft flight and engine variables). This step creates a data set to be modeled from any source as long as it is from a consistent wear position for the system. In other words, it is important to ensure that the trained model represents a consistent reference or base point condition in the life of the system. For example, with engines, training data is preferably selected from the middle of the engine's life when EGT performance is relatively stable. If selected correctly, this training data will contain flights that represent a typical set of environmental, flight, and engine parameter conditions that are diverse enough to represent the conditions encountered in future operations. Selecting training data in this way improves results over using data from the entire engine lifetime. However, performance may decrease if the slice of data is too small, leading to insufficient covariate diversity.

In this embodiment the method further comprises the step of fitting a statistical model to the training data set to relate a predicted response to nuisance variables at the base condition. The statistical model may comprise linear regression, non-linear regression, or adaptive nonparametric procedures such as random forest techniques. A random forest is an example of a tree ensemble which is a nonparametric statistical technique. A nonparametric random forest technique or model may be preferred because it is flexible and is data driven and one does not need to specify what the relationship should be. This step empirically relates the mechanical system output (e.g. engine EGT) or predicted response to nuisance variables or outside variables, such as environmental influences (e.g., temperature and air quality), flight conditions, system faults, and mechanical parameters. The modeling software code may be written in the open source "R" statistical language. For new environmental (e.g., flight and engine) data, the model predicts the mechanical system output (e.g., EGT) using the trained model.

In this embodiment the method further comprises the step of using an output model to predict what an observed response would have been at the base condition and calculating the difference between the observed response and the predicted response to predict the one or more operational states of the mechanical system. The predicting component uses the output model to predict the operational states of the mechanical system. The predicting component may be in the form of a suitable modeling software. This step generates or calculates the predicted operational states or residuals, which is the difference between the observed response or mechanical system output (e.g., EGT) (part of the preprocessed data) and the predicted response. The residuals may represent mechanical system wear over time (e.g., engine performance degradation as noted by mechanical energy needed to produce the same work) or operational anomaly (part failure). The flexible statistical models can be applied to data collected over the mechanical system's life, to account for irrelevant or nuisance factors, and to generate a predictive model of operational states such as wear, degradation or anomalies. Using the model adjusts for environmental and other nuisance factors and references back to the consistent wear or base point condition. By example, for aircraft engines, the method may use the statistical model to model aircraft gas turbine engine EGT as a function of environmental, flight and engine parameters and to generate the residuals as a predictive model of engine wear. The method may further comprise the step of using the predicted one or more operational states for trend analysis.

Figure 2:
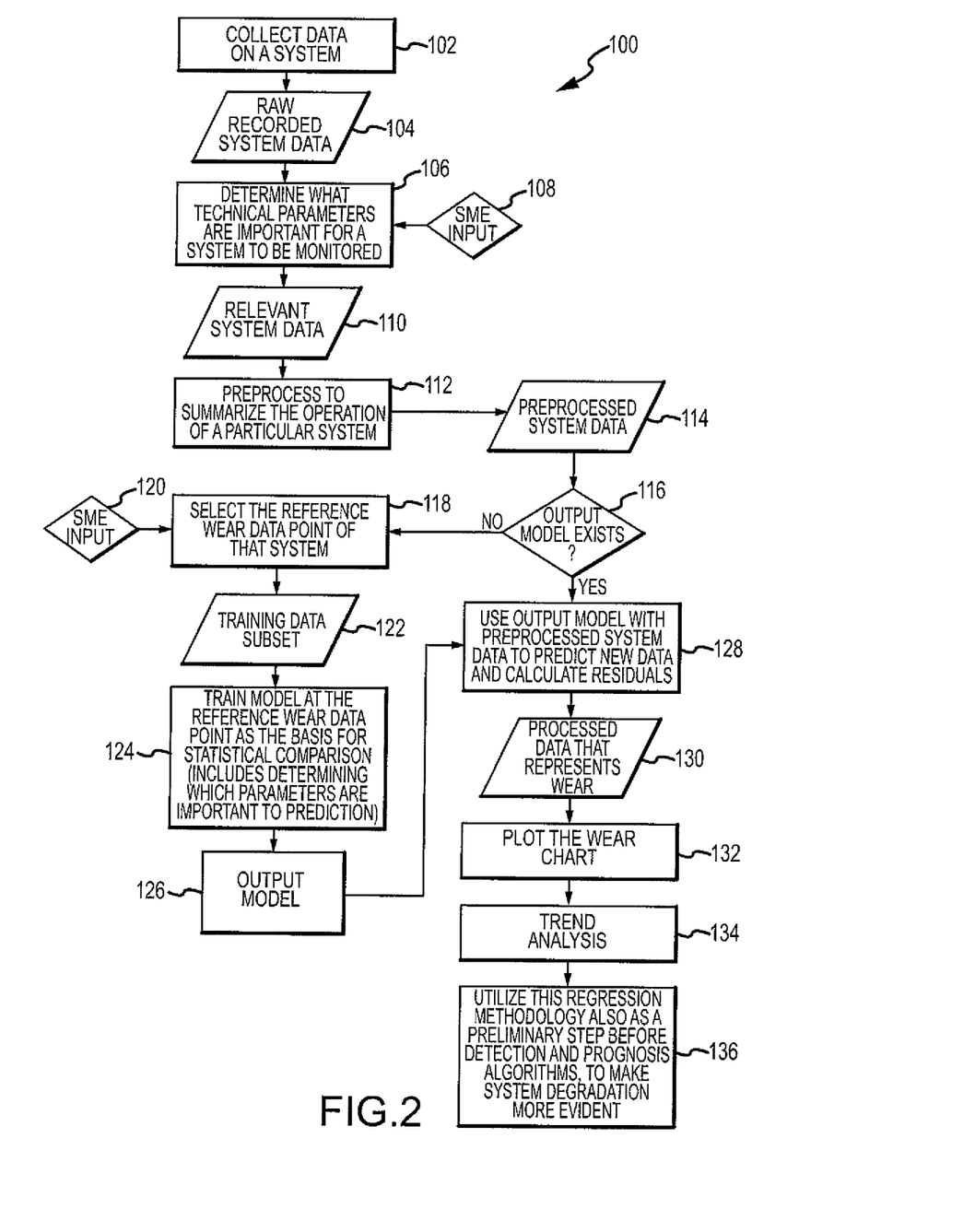
FIG. 2 is a block flow diagram of another embodiment of the system and method of the disclosure.

FIG. 2 is a block flow diagram of another embodiment of the system and method of the disclosure, indicated by reference number 100. In another embodiment of the disclosure, there is provided an automated data driven method for predicting wear of a mechanical system over time. The mechanical systems may be engines, engines, turbines, tires, and brakes, found in aircraft, automobiles, trucks, watercraft, power generator units, military vehicles, and other vehicles. As shown in FIG. 2, in this embodiment, the system and method comprise the element or step, as indicated by reference number 102, of collecting data on the mechanical system from a data recording device. The system and method may further comprise the element or step, as indicated by reference number 104, of generating the raw recorded data on the mechanical system. As discussed with the above embodiment, the data collected may include numerous technical parameters specific to a particular mechanical system, as well as various environmental and operational data. In addition, the data recording device for data collected for an aircraft engine may be a Quick Access Recorder (QAR) on an aircraft. The data may be recorded and collected from a single aircraft or multiple aircraft over the lifetime of the mechanical system. The data may be recorded and collected during initial climb of the aircraft over many flights, during descent of the aircraft over many flights, during cruising of the aircraft over many flights, or during other operational modes of the aircraft. The collecting data step may further comprise the step of determining one or more technical parameters of the mechanical system to be measured relevant to the predicting of the one or more operational states.

As shown in FIG. 2, in this embodiment, the system and method further comprise the element or step, as indicated by reference number 106, of determining and measuring one or more technical parameters of the mechanical system relevant or important to the predicting of the one or more operational states. SME (subject matter expert) input 108 may be used to input various technical parameters of a particular mechanical system in order to determine and measure such technical parameters. By example, technical parameters collected for an aircraft engine may include, but are not limited to, such data as exhaust gas temperature (EGT), Mach number, engine spool speeds, pressure altitude, total air temperature, calibrated air speed, oil pressure, oil quantity, sensor information, heater information, fuel flow, engine pressure ratio, flight mode, throttle lever angle, and other suitable data. The system and method may further comprise the element or step, as indicated by reference number 110, of generating the relevant mechanical system data.

As shown in FIG. 2, in this embodiment, the system and method further comprise the element or step, as indicated by reference number 112, of preprocessing the collected mechanical system data to summarize operation of the mechanical system. As discussed with the above embodiment, the preprocessing step transforms the large amounts of data collected into snapshots of data representative of the health of the mechanical system that a user is most interested in. The preprocessing step determines when during the operation of the mechanical system the data is collected, what segment of the mechanical system is to be predicted, and how to reduce the amount of data to determine the results. The preprocessing software code may be written in Statistical Analysis Software (SAS) or another suitable commercially available software code. The system and method may further comprise the step, as indicated by reference number 114, of generating the preprocessed mechanical system data.

As shown in FIG. 2, in this embodiment, the system and method further comprise the element or step, as indicated by reference number 116, of determining whether a wear model exists. If a wear model exists, then the steps following "YES" in FIG. 2 are followed. If a wear model does not exist, then the steps following "NO" in FIG. 2 are followed. For the steps following "NO", as shown in FIG. 2, in this embodiment, the system and method further comprise the element or step, as indicated by reference number 118, of selecting a consistent or reference wear data point (base condition) of the mechanical system. This step includes selecting a training data set that represents a base condition for statistical comparison. In order to build a statistical model, it is preferable to have a consistent known starting point. SME (subject matter expert) input 120 may be used to input various reference wear data points of a particular mechanical system in order to select the reference wear data point. The system and method may further comprise the step, as indicated by reference number 122, of generating the training data subset.

As shown in FIG. 2, in this embodiment, the system or method further comprise the element or step, as indicated by reference number 124, of fitting a statistical model to the training data set to relate a predicted response to nuisance variables at the base condition, that is, that the wear data point is a base point for statistical comparison. Such nuisance variables can include environmental factors (e.g., temperature and air quality), flight information, system faults, and mechanical parameters. This step trains a statistical model at the reference wear data point as the basis for statistical comparison and includes determining which technical parameters are important for prediction or monitoring. Training data sets are created during periods when a mechanical system output (e.g., engine EGT) is relatively stable, yet there is sufficient variability in other nuisance factors (e.g., environmental, flight, and mechanical parameters) to represent the variety of conditions under which the mechanical system (e.g., aircraft engine) operates. The system and method may further comprise the step, as indicated by reference number 126, of using the statistical model to generate the output model.

As shown in FIG. 2, in this embodiment, the system and method further comprise the element or step, as indicated by reference number 128, of using an output model to predict what an observed response would have been at the base condition and calculating the difference between the observed response and the predicted response to predict the wear of the mechanical system. As discussed with the above embodiment, this step generates or calculates the predicted operational states or residuals, which is the difference between the observed response or mechanical system output (e.g., EGT) and the predicted response. For new environmental (e.g., flight and engine) data, the model predicts the mechanical system output (e.g., EGT) using the trained model. The residuals may represent mechanical system wear over time (e.g., engine performance degradation as noted by mechanical energy needed to produce the same work) or operational anomaly (part failure). The flexible statistical model can be applied to data collected over a mechanical system's life, to account for irrelevant factors and generate a predictive model of operational states such as wear, degradation or anomalies. Using the model adjusts for environmental and other factors and references back to a consistent wear point. By example, for aircraft engines, the method may use the statistical model to model aircraft gas turbine engine exhaust gas temperature (EGT) as a function of environmental, flight and engine parameters and to generate the output data as a predictive model of engine wear. The statistical model may comprise linear regression, non-linear regression, or adaptive nonparametric procedures such as random forest techniques. Preferably, the statistical model is random forest technique. A nonparametric random forest technique or model is preferred because it is flexible and is data driven and one does not need to specify what the relationship should be.

As shown in FIG. 2, in this embodiment, the system and method further comprise the element or step, as indicated by reference number 130, of generating processed data that represents wear. As shown in FIG. 2, in this embodiment, the system and method further comprise the element or step, as indicated by reference number 132, of plotting the predicted operational states or wear chart. As shown in FIG. 2, in this embodiment, the system and method further comprise the element or step, as indicated by reference number 134, of using the plotted operational states or wear for trend analysis. As shown in FIG. 2, in this embodiment, the system and method further comprise the element or step, as indicated by reference number 136, of using the regression (random forest) methodology or model also as a preliminary step before detection and prognosis algorithms to make the mechanical system wear or degradation more evident.

The embodiments of the method and system of the disclosure are data driven and based on empirical models that can be applied to many subsystems. In addition, the method and system produce results that have less variation than the normalized data supplied by existing manufacturers (legacy). The method and system may have several applications, including but not limited to, application to military cargo aircraft, application to various jet engine models used on many commercial and military jet aircraft, application to airlines and other aircraft operators that monitor system conditions, application to automobiles, trucks, watercraft, power generator units, military vehicles, and other apparatus with mechanical systems, application for predicting tire pressure loss and brake system failures, and application to predict remaining useful life of equipment or mechanical systems in order to repair or replace the equipment or mechanical system in a timely manner. By accurately tracking wear, degradation and anomalies of mechanical systems, the system and method of the disclosure anticipate failures of such mechanical systems and provide a more precise way to predict and monitor mechanical wear or degradation.

EXAMPLES

Experimental testing was conducted using the data driven system and method of the disclosure as discussed above. The tests included preprocessing large amounts of recorded data, selecting suitable training data, applying a regression method to model EGT as a function of nuisance variables, and producing residuals that could be interpreted as engine wear (plus error). This testing investigated several statistical techniques, both parametric (linear and nonlinear regression) and nonparametric (random forests). As a baseline for comparison, known normalization plots of EGT from other existing manufacturer or legacy methods were used. The testing showed that the random forest approach outperformed the legacy results in the sense that the random forest predictions had a similar range for engine wear, but about 25% smaller variation. With regard to EGT testing, parametric regression models were not as successful, failing to perform better than legacy methodology. Thus, random forest techniques were preferred.

The testing used Quick Access Recorder (QAR) data from several aircraft, from the time the engine was installed to the time of the testing. There were several years of data. Data from some military cargo aircraft that went into service in 2003 was used. The data periods for the three aircraft were: 1) Airplane #1: October 2003 to January 2007; 2) Airplane #2: March 2003 to March 2007; and 3) Airplane #3: February 2003 to April 2007. The data consisted of about thirty parameters collected during initial climb over many flights. The types of variables included aircraft environmental/operational data such as Mach number, and engine parametric data such as engine spool speeds. The results of legacy EGT normalization were also used as a baseline for comparison. In particular, the parameters for each airplane included some of the following: calibrated air speed, Mach number, pressure altitude, total air temperature, time, EGT, engine pressure ratio, flight mode, oil pressure, oil quantity, oil temperature, pressure sensors, burner pressure, temperature sensors, throttle lever angle, fuel flow, bleed actuator position, pack flow, and other various parameters.

The data provided by legacy or existing manufacturer showed the life of the engine and normalized EGT values (expressed as margin—a threshold temperature minus the normalized EGT). The normalized values exhibited three distinct parts to the life of a gas turbine engine: 1) break-in period, 2) prime performance life, and 3) end of performance life. The goal was to normalize to the largest "constant" value point.

In order to trend aircraft engine EGT over time, the most stable engine operational point possible must be obtained for each flight, ideally at or near the maximum engine operating point. During flight this occurs in two modes: cruise and takeoff. Very stable engine data and aircraft parametric data may be recorded during aircraft cruise. However, the aircraft may not reach cruise during every flight (e.g. during training). Also, during cruise, the engine is not near its maximum operation. During takeoff, the engine is operating near or at its maximum for a fixed period of time, but aircraft parametric and other engine data may be changing. The algorithm used found a window of data in which maximum EGT occurred.

A variety of experiments were conducted on data collected during initial climb. The model was trained on engines, and then applied to other engines from the same aircraft. The effect of varying the EGT range used to select training data was explored, as well as the effect of training set size and covariate diversity.

To obtain different instances of initial climb data, the following algorithm was used that took into account Actual Engine Pressure Ratio (EPR), Flight Mode (FM), and Throttle Lever Angle (TLA), and "t" was the current time and "t−1" was the previous time.

Calculate $\Delta EPR_t = |EPR_t - EPR_{t-1}|$

Calculate $\Delta TLA_t = |TLA_t - TLA_{t-1}|$

Calculate $\Delta FM_t = FM_t - FM_{t-1}$

Check $\Delta FM_t$

If $\Delta FM_t \neq 0$, start a new flight grouping.
If $\Delta FM_t \neq 1$, then label the flight group for dropping later. Label it DROP FLIGHT.
If number of observations in the flight grouping is less than 20, then label it DROP FLIGHT.

Check $\Delta EPR_t$.

If $\Delta EPR_t > x_{threshold}$ then data is not stable. So cannot use the data. Label it DROP DATA.
For the same flight group, do not use any data after the first time $\Delta EPR_t > x_{threshold}$.
Label it DROP DATA.
Check $\Delta TLA_t$. If $\Delta TLA_t > y_{threshold}$ then data is not stable. So data cannot be used. Label it DROP DATA.
Create data set by dropping all observations that are labeled either DROP FLIGHT or DROP DATA.
Calculate Maximum EGT for each flight segment.
Take all the observations from the flight segment that has EGT=Maximum EGT.
Calculate the average and median of all the other variables.
Note the values of the all the other variables, the first time maximum EGT was reached.

Four examples of EGT vs. Time were selected to reflect some of the different scenarios that were encountered. A maximum EGT value and the corresponding summary for the other variables were calculated for each of these flight counts. 1) For Flight Count=1, the maximum EGT was 488. This value was attained for 27 observed values. The values for the other variables were calculated based on these 27 observations. The first and the last time this EGT was achieved was on 19 Feb. 2003 at 17:46:38 and 17:47:08 between altitudes of 21 ft and 836 ft. 2) For Flight Count=2, the maximum EGT was 526. This value was attained for 12 observed values. The values for the other variables were calculated based on these 12 observations. The first and the last time this EGT was achieved was on 21 Feb. 2003 at 13:23:37 and 13:23:48 between altitudes of 1311 ft and 1500 ft. This happened at the end of the "stable data period". 3) For Flight Count=9, the maximum EGT was 522. This value was attained for a single time (24 Feb. 2003 at 18:46:53) and the values for the other variables were based on this single time. 4) For Flight Count=11, the maximum EGT was 540. This value was attained for 20 observed values. The values for the other variables were calculated based on these 20 observations. The first and the last time this EGT was achieved was on 25 Feb. 2003 at 15:37:54 and 15:38:23 between altitudes of 728 ft and 1657 ft. Note that there were a few time points within the time when the maximum EGT was attained, when the EGT was slightly below. These points were not used in the analysis.

Training data was selected from the middle of engine life when EGT performance was relatively stable. If chosen correctly, this training data contained flights that represented a typical set of environmental, flight, and engine parameter conditions that were diverse enough to represent the conditions encountered. Preliminary experiments showed that selecting training data in this way improved results over using data from the entire engine lifetime. However, performance decreased when the slice of data was too small, leading to insufficient covariate diversity. It was important to ensure that the trained model represented a consistent reference point in the life of the system.

In using a statistical model to model the relationship between EGT and other variables or nuisance variables, it was assumed that an observed EGT measurement at a time t was a function of wear $W_t$, but also of other nuisance variables $X_t$ (environmental, flight, and engine parameters):

$$EGT_t = f(X_t) + W_t + \epsilon_t$$

where $\epsilon_t$ was an error term consisting of measurement error, other variables that have not been measured, and possible model misspecification. The following approach was used:
Estimate the function $\hat{f}(X_t)$ using a statistical regression estimator.
Then the residuals equal wear plus error:

$$EGT_t - \hat{f}(X_t) = W_t + \epsilon_t$$

To estimate the function $f$, linear, parametric nonlinear and adaptive parametric models were tested. Adaptive nonparametric random forest techniques were preferred.

The goal was to reproduce the range of the legacy results, but with less scatter (range and scatter as defined below). These objectives were measured using Bollinger bands as follows: 1) choose a fixed window width, 2) calculate average, standard deviation (sd) for each window, 3) construct Bollinger bands as average±k*sd where k is a constant. k=2 was chosen, so that the bands roughly corresponded to 0.95 confidence bands under a Gaussian distribution assumption. The following were calculated: range as the maximum moving average minus the minimum moving average (one value for all the observations), and scatter as the upper minus the lower Bollinger bands (there was one value for each observation).

Figure 3:
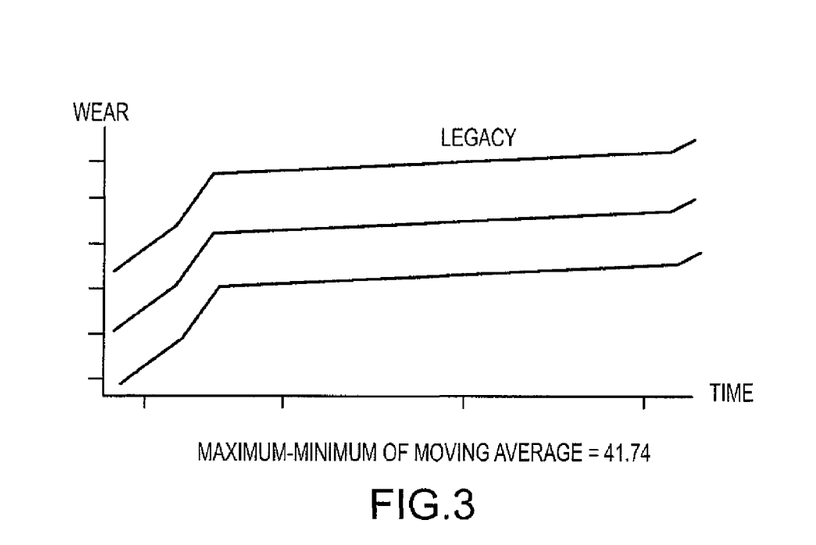
FIG. 3 is a margin plot showing legacy results for exhaust gas temperature (EGT) normalization.
Figure 4:
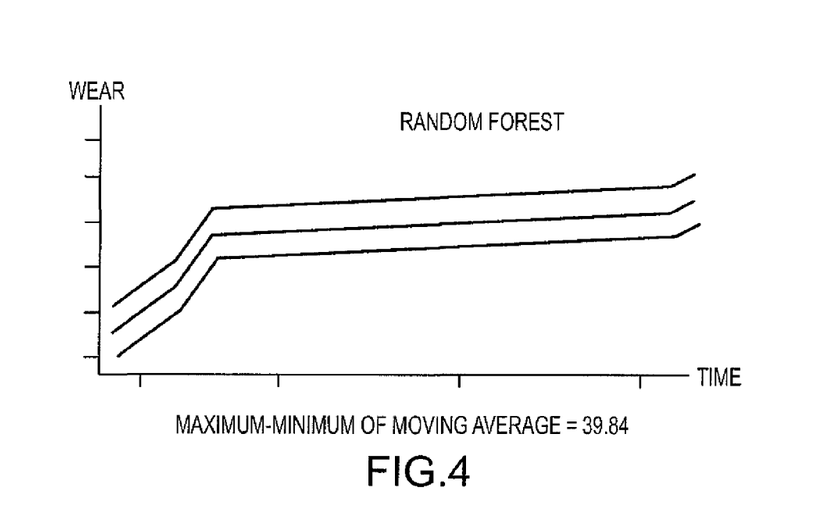
FIG. 4 is a margin plot showing random forest results for EGT normalization.

To make the results consistent with the legacy margin results, the residuals were transformed, and were started at the same maximum moving average as the legacy margin. In summary, three types of training data were used. All data consisted of initial climb data: 1) all the flights available, 2) a subset of flights coming from a known and consistent system wear point, 3) an even more restrictive subset. For the restricted data set 2), the distributions of the covariates were comparable for the full data set and the restricted data set, i.e., histograms showed comparable shapes, and the range of values was similar. FIG. 3 is a margin plot showing legacy or existing manufacturer results for exhaust gas temperature (EGT) normalization. FIG. 4 is a margin plot showing random forest results for EGT normalization. The random forest techniques gave a similar range, but resulted in smaller scatter than the legacy technique. Based on the success of applying random forests to data 2), the training data was further restricted. However, this further restriction drastically reduced the sample size and the distribution of the covariates differed from that for the full data set.

Figure 5:
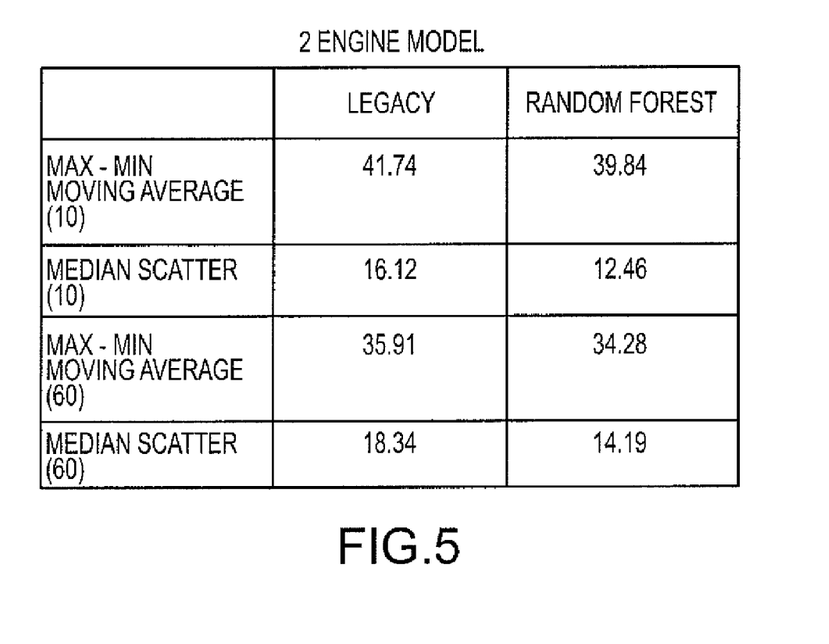
FIG. 5 is a table summarizing legacy and random forest statistics using a two engine model; and, FIG. 6 is a table summarizing legacy and random forest statistics using a three engine model.

Space only allowed showing the analysis on data set 2) from one aircraft for which data was collected over about four years. Engines 1 and 4 were first trained on, and then Maximum EGT was predicted on engines 2 and 3. In the Bollinger bands, window widths of 10 and 60 were used. Plots for engine 2 and window width 10 ad qualitatively the same conclusions for window width 60 and engine 3. Both plots had similar range (overall decrease in margin), but the data driven method had less scatter (median=12.46 vs. 16.12 for legacy). FIG. 5 shows a table summarizing some legacy and random forest statistics using two engines (Engine 2) to build the model in training. The table of FIG. 5 shows that the random forest methods performed better than the legacy results in terms of predicting wear and reducing scatter in the wear predictions.

Figure 6:
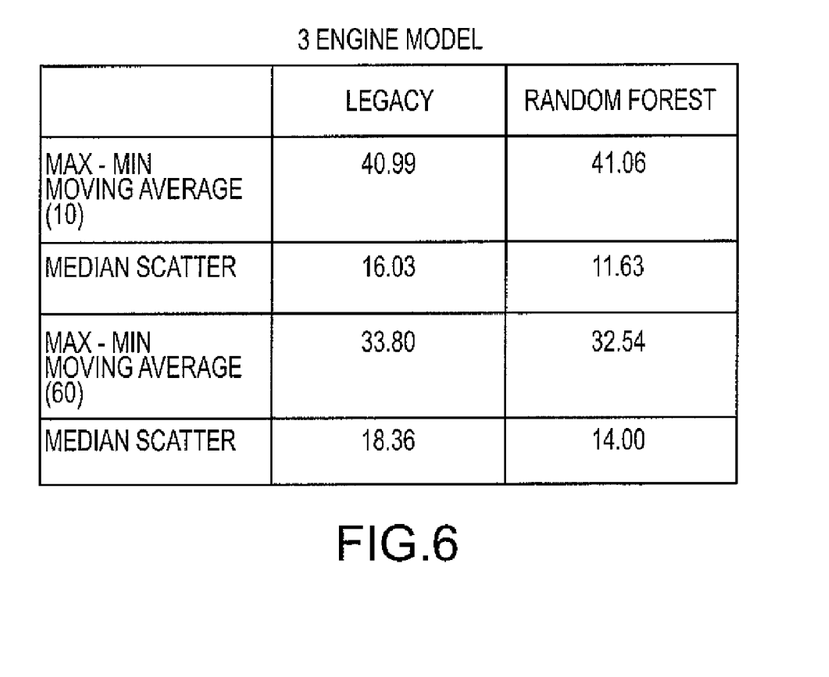

The model was also fit to three engines, and the remaining one was predicted. The results were even better because the range was almost identical. This gave some evidence that increased training set size (1464 vs. 1035 flights) may have accounted for the improvement. FIG. 6 shows a table summarizing legacy and random forest statistics using three engines (Engine 3) to build the model in training. The table of FIG. 6 shows that the random forest methods performed better than the legacy results in terms of predicting wear and reducing scatter in the wear predictions.

Conclusions—The experiment was used to model the relationship between gas turbine engine EGT and environmental, flight, and engine parameters. The methodology produced results that had less variation than the normalized data supplied by existing manufacturers. After accounting for irrelevant variables, the residuals more clearly revealed engine wear. Most of the analysis was done on initial aircraft climb data as the EGT attained its maximum value at this flight stage. Experiments showed the importance of selecting a range of EGT values which lead to a training set of sufficient diversity in which the covariate distributions were similar to the covariate distributions in the data of all flights. While there was evidence that having more training data improved results, the data must be used from approximately the same mechanical wear state. This modeling could be done for any flight phase and for other dependent variables, but a steady known condition was best. Moreover, the methodology could be applied to similar normalization problems including tire pressure or brake wear. The regression methodology could be applied as a preliminary step before detection and prognosis algorithms, to make system degradation more evident.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An automated data driven method for predicting one or more operational states of a mechanical system over time, the method comprising the steps of:
    collecting data on the mechanical system from a data recording device, the collected data comprising technical parameters of the mechanical system, environmental data, and operational data;
    preprocessing the collected data to determine when during operation of the mechanical system the data is collected, what segment of the mechanical system is to be predicted, and how to reduce the amount of data to produce snapshots of data representative of the health of the mechanical system;

selecting a training data set from the snapshots of the collected data that represents a base condition for statistical comparison, wherein the training data set is created when a mechanical system output is stable yet there is variability in nuisance variables to represent operational conditions of the mechanical system;

fitting a nonparametric statistical regression model to the training data set using a computer to relate a response to the nuisance variables at the base condition, wherein a relationship between the response and the nuisance variables is not specified by model parameters; and, using the computer to apply the fitted nonparametric statistical regression model to a single set of response and nuisance variables observed at one time during operation of the mechanical system to generate a predicted response representing what the response would have been at the base condition and calculating the difference between the response and the predicted response to predict the one or more operational states of the mechanical system.

2. The method of claim 1 wherein the collecting data step further comprises the step of determining one or more technical parameters of the mechanical system to be measured relevant to the predicting of the one or more operational states.

3. The method of claim 1 wherein the method further comprises the step of using the predicted one or more operational states for trend analysis.

4. The method of claim 1 wherein the nonparametric statistical regression model is a random forest technique.

5. The method of claim 1 wherein the mechanical system is selected from the group comprising engines, turbines, tires, and brakes.

6. The method of claim 1 wherein the mechanical system is in an apparatus selected from the group comprising aircraft, automobiles, trucks, watercraft, power generator units, and military vehicles.

7. The method of claim 1 wherein the operational state is selected from the group comprising wear, degradation, part failure, and anomalies.

8. The method of claim 1 wherein the method uses the nonparametric statistical regression model to model aircraft gas turbine engine exhaust gas temperature (EGT) as a function of environmental, flight and engine parameters and to generate the output model as a predictive model of engine wear.

9. The method of claim 1 wherein the nuisance variables are selected from the group comprising environmental influences, flight conditions, system faults, and mechanical parameters.

10. An automated data driven method for predicting wear of a mechanical system over time, the method comprising the steps of:

collecting data on the mechanical system from a data recording device, the collected data comprising technical parameters of the mechanical system, environmental data, and operational data;

selecting from the collected data one or more of the technical parameters of the mechanical system relevant to the predicting of wear of the mechanical system;

preprocessing the collected data to summarize operation of the mechanical system to determine when during operation of the mechanical system the data is collected, what segment of the mechanical system is to be predicted, and how to reduce the amount of data to produce snapshots of data representative of the health of the mechanical system;

selecting a training data set from the snapshots of the collected data that represents a base condition for statistical comparison, wherein the training data set is created when a mechanical system output is stable yet there is variability in nuisance variables to represent operational conditions of the mechanical system;

fitting a nonparametric statistical regression model to the training data set using a computer to relate a response to the nuisance variables at the base condition, wherein a relationship between the response and the nuisance variables is not specified by model parameters;

using the computer to apply the fitted nonparametric statistical regression model to a single set of response and nuisance variables observed at one time during operation of the mechanical system to generate a predicted response representing what the response would have been at the base condition and calculating the difference between the response and the predicted response to predict the one or more operational states of the mechanical system;

plotting the predicted wear; and, using the plotted wear for trend analysis.

11. The method of claim 10 wherein the nonparametric statistical regression model is a random forest technique.

12. The method of claim 10 wherein the mechanical system is selected from the group comprising engines, turbines, tires, and brakes.

13. The method of claim 10 wherein the mechanical system is in an apparatus selected from the group comprising aircraft, automobiles, trucks, watercraft, power generator units, and military vehicles.

14. The method of claim 10 wherein the method uses the nonparametric statistical regression model to model aircraft gas turbine engine exhaust gas temperature (EGT) as a function of environmental, flight and engine parameters and uses the output model to predict engine wear.

15. An automated data driven system for predicting one or more operational states of a mechanical system over time comprising:

a data collection component for collecting data on the mechanical system, the collected data comprising technical parameters of the mechanical system, environmental data, and operational data;

a preprocessing component for preprocessing the collected data in order to determine when during operation of the mechanical system the data is collected, what segment of the mechanical system is to be predicted, and how to reduce the amount of data to produce snapshots of data representative of the health of the mechanical system;

a training data set selection component for selecting a training data set from the snapshots of the collected data that represents a base condition for statistical comparison, wherein the training data set is created when a mechanical system output is stable yet there is variability in nuisance variables to represent operational conditions of the mechanical system;

a statistical nonparametric regression modeling component for fitting a statistical nonparametric regression model to the training data set to relate a response to the nuisance variables at the base condition, wherein a relationship between the response and the nuisance variables is not specified by model parameters;
a fitted statistical nonparametric regression model; and,
a predicting component that applies the fitted nonparametric regression model to a single set of response and nuisance variables observed at one time during operation of the mechanical system to generate a predicted response representing what the response would have been at the base condition and calculating the difference between the response and the predicted response to predict the one or more operational states of the mechanical system.

16. The system of claim 15 wherein the statistical nonparametic regression modeling component is a random forest technique.

17. The system of claim 15 wherein the mechanical system is selected from the group comprising engines, turbines, tires, and brakes.

18. The system of claim 15 wherein the mechanical system is in an apparatus selected from the group comprising aircraft, automobiles, trucks, watercraft, power generator units, and military vehicles.

* * * * *